Dec. 1, 1970  W. H. WATTENBURG ET AL  3,544,225

PEAK READING OPTICAL DENSITY MEASURING SYSTEM

Filed Dec. 13, 1967  3 Sheets-Sheet 1

INVENTORS
WILLARD H. WATTENBURG
DONALD A. GLASER
BY HECTOR O. CONDE
Flehr, Hohbach, Vest,
Albritton & Herbert
ATTORNEYS

INVENTORS
WILLARD H. WATTENBURG
DONALD A. GLASER
HECTOR O. CONDE
ATTORNEYS

United States Patent Office 3,544,225
Patented Dec. 1, 1970

3,544,225
PEAK READING OPTICAL DENSITY
MEASURING SYSTEM
Willard H. Wattenburg, Orinda, Donald A. Glaser, Berkeley, and Hector O. Conde, San Pablo, Calif., assignors, by mesne assignments, to Berkeley Scientific Laboratories, Inc., Berkeley, Calif., a corporation of Texas
Filed Dec. 13, 1967, Ser. No. 690,316
Int. Cl. G01n 21/06; G01j 1/44; G06m 7/00
U.S. Cl. 356—201                             6 Claims

ABSTRACT OF THE DISCLOSURE

An optical density measuring system for determining growth or reaction rates in materials disposed in a plurality of sample tubes sequentially and repeatedly presented to the optical system. The system includes means for commanding a peak reader which provides a signal representative of the peak density and means for indicating said density.

BACKGROUND OF THE INVENTION

This invention relates generally to an optical density measuring system and more particularly to a system useful for determining growth or reaction rates of samples.

There are a number of applications where it is important to periodically measure the optical density of a sample. This information can give an indication of reaction time, growth rate, and other changes which are reflected by changes in optical density with time. One example is the study of growth of bacterial cultures in a nutrient or the effect of inhibitors on such growth. The study of the kinetic of enzymatic reactions is another example. Generally, the measurements are made by projecting a light beam, which may be monochromatic, through a sample holder such as a cuvette or test tube, receiving the transmitted light with a photoelectric transducer and indicating or registering the output from the transducer.

The measurement of growth of a single culture or sample is simple. A conventional test tube can be filled with the sample and placed in the light beam and readings taken periodically. Where it is only desired to obtain the growth rate, an absolute reading is not required. A conventional test tube can be employed as long as it remains in one position.

However, it is desirable to be able to measure the changes in optical density of a plurality of samples with a single optical measuring apparatus. Prior art apparatus includes means for disposing a plurality of sample holders in racks and means are associated with the racks for moving the same to sequentially present the sample holder in each of the racks to an optical measuring system. It is, however, difficult to accurately position or locate the racks and, therefore, the optical path may change from one reading to the next. To overcome this difficulty, cuvettes having parallel flat faces have been employed. This, of course, makes the sample holders relatively expensive.

Many alternatives have been used top rovide absolute measurements using this system. Matched test tubes, as mentioned, is one. Alternatively all test tubes, whose identification is provided, can be first calibrated by filling them with the same known substance. This first reading can be remembered, the test tubes emptied, washed, dried and the unknown substance poured into them. The answer to the next reading, multiplied by a factor proportional to the first reading, is the optical density of the unknown. Of course, during the operation, the test tubes should not be rotated, as light irregularities in concentricity induce large errors in the readings, the test tubes being part of the optical system.

SUMMARY OF THE INVENTION AND OBJECTS

Generally, the present invention relates to a system which, like in the former apparatus, includes a reading station having a light beam and a photoelectric transducer spaced therefrom to receive the light transmitted by the sample and holder and develop an electrical light. The system also includes means for sequentially and repeatedly presenting samples to the reading station. The system of the present invention allows the sample to move continuously through the light beam. Means are included to generate a signal which instructs the circuits to read the light transmitted at a particular time. The output from the photoelectric transducer is then read and a output signal representative of the peak amplitude is generated. This signal is received, processed and indicated. Means are provided for conditioning the signal receiving circuit to receive the signal from the next sample tube following indication.

It is a general object of the present invention to provide an improved system of the above type which does not require expensive sample holders.

It is another object of the present invention to provide a system of the above character which is simple in construction.

It is another object of the present invention to provide a system in which the focusing characteristics of the test tubes are employed to provide a maximum signal to the circuits which serve to store and provide an indication of the peak amplitude.

It is another object of the present invention to provide a system for analyzing growth and reaction kinetics of selected samples.

The foregoing and other objects of the invention will become more clearly apparent from the following description when taken in connection with the accompanying drawing.

DESCRIPTION OF THE PREFERRED EMBODIMENT

Figure 1:
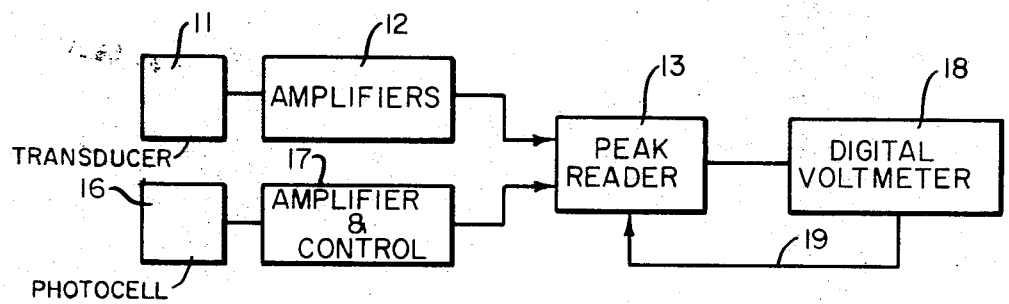
FIG. 1 is a block diagram of a system in accordance with the invention.

Referring to the block diagram of FIG. 1, a photoelectric transducer 11 is adapted to receive the light transmitted by the sample holder. The output of the transducer is applied to amplifier 12. The output of the amplifier is applied to a peak reader 13. In addition to the signal representative of the transmission, a control signal is applied to the peak detector. This signal is derived from a photocell 16 which has its output applied to an amplifier and control circuit 17, and thence to a peak reader 13.

This signal controls the peak reader whereby it is active during a short period of time at or near the peak signal from transducer 11. The output from the peak reader may be applied to a digital voltmeter 18 to provide an indication of the amplitude. The digital voltmeter provides a feedback signal 19 to the peak reader to reset the peak reader and ready it for the next sample holder presented to the photocell.

Figure 2:
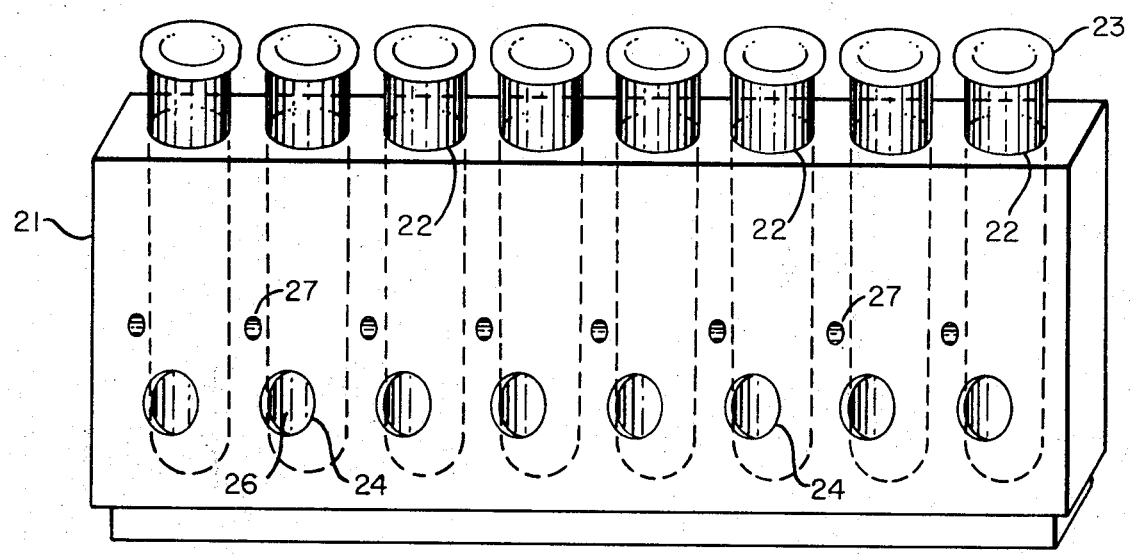
FIG. 2 is a perspective view of a test tube rack carrying test tubes.
Figure 3:
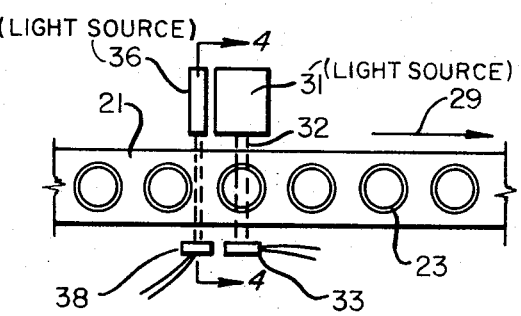
FIG. 3 schematically shows the test tube rack associated with a reading station.

Referring particularly to FIG. 2, a tube holder or rack 21 includes a plurality of wells 22 adapted to receive sample holders or tubes 23. The sample holders are vertically disposed in the rack 21. An opening 24 is provided near the bottom of the holder to expose the lower portion 26 of the holders. In the present example, a plurality of locating holes 27 are provided in the holder. As will be presently described, the locating holes serve to provide an output pulse to the amplifier and control circuit 17 to activate the peak reading circuit so that it reads the density as each opening 24 is presented to the optical reading system. Referring particularly to FIG. 3, the holder 21 including sample holders 23 is indicated as travelling in the direction as shown generally by the arrow 29. As the holder travels, it serves to sequentially present sample holders 23 to the optical reading system. For example, the optical reading system may comprise a light source 31 which projects a beam 32 towards a phototransducer 33. As the openings 24 are placed in the light beam, light is transmitted through the holder and sample to the transducer which develops an output electrical signal.

Figure 4:
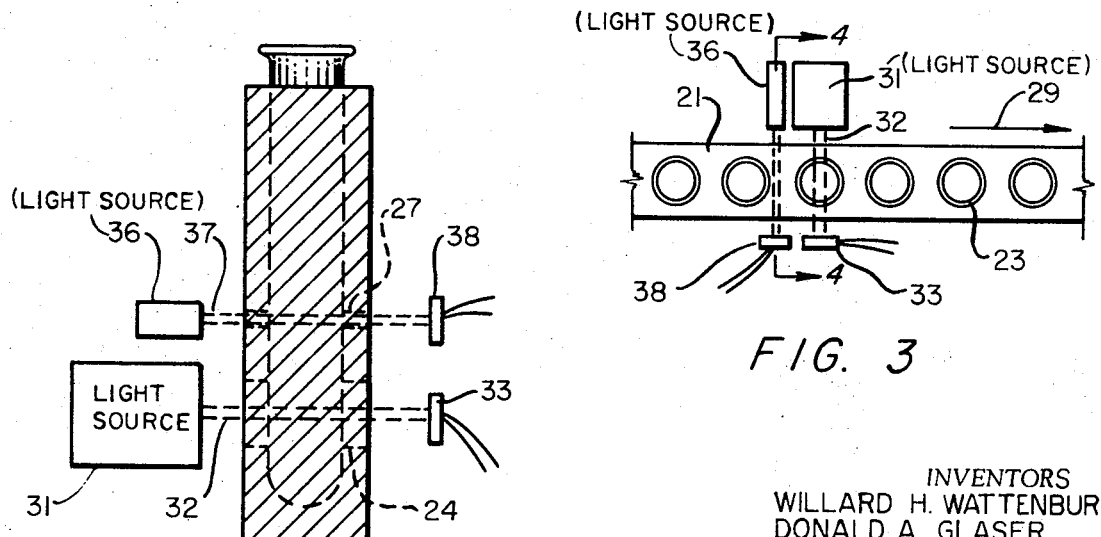
FIG. 4 is a view taken along the line 4—4 of FIG. 3.

There is also provided a second light source 36, FIG. 4, which projects a beam 37 adapted to impinge on the rack so that it projects through the locating holes 27 as a rack is moved past the reading station. When an opening 27 is in line with the beam 37, light is transmitted to a photocell 38 which generates an output pulse which is applied to the amplifier and control circuit 17. The output pulse accurately indicates the location or position of the holder.

As described, the rack is moved past the read station. The present apparatus includes a feeding mechanism which moves a plurality of racks each containing sample holders in an endless loop past the optical reading system. A suitable mechanism for moving and presenting test tubes in the manner described might, for example, be an LKB 7000A Ultro-Rack Fraction Collector, suitably modified for that purpose.

Figure 5:
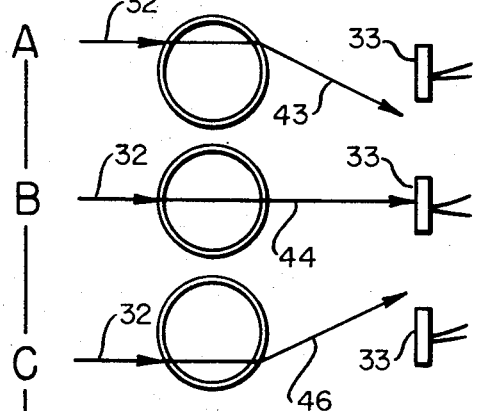
FIG. 5 shows the light beam and focusing characteristics of the test tube.

Referring now to FIG. 5, the beam 32 is shown for three positions of a sample holder. In the first position, the beam is shown as it passes through the holder as it is first presented thereto. It is noted that the walls of the holder deflect the beam as shown at 43 and that it does not impinge upon the transducer 33. When the tube is in its center position, the beam strikes substantially parallel walls and is then projected as shown at 44 onto the transducer 33. As the test tube continues to advance, the beam strikes the other curved portion of the test tube and is deflected as shown at 46. Thus, there will be a peak output from the transducer 33 when the holder is centered.

Figure 8:
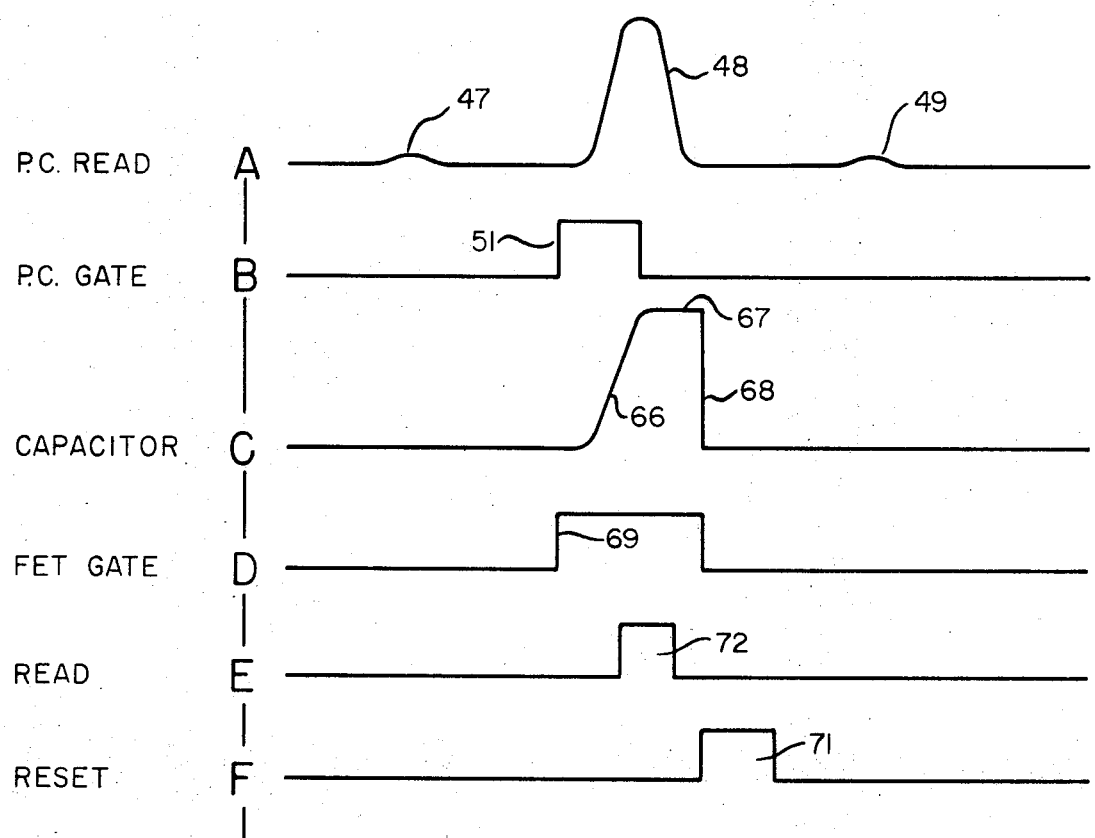
FIG. 8 shows the waveforms at various points in the circuit of FIG. 7.

The output of the photocell 33 is shown in FIG. 8A. The first peak 47 represents stray light which impinges upon the transducer as the opening 24 advances through the beam. Thereafter, the light is deflected from the transducer by the sample holder and there is no output until the beam is focused to strike the transducer and produce an output peak 48. As the rack continues to advance, a third output 49 is obtained which is the stray light between the other side of the sample holder and the opening 24.

The pulse generated by the transducer 38 is shown in FIG. 8B. It is seen that the pulse begins before the output from the photocell 33 occurs and ends shortly thereafter.

Figure 6:
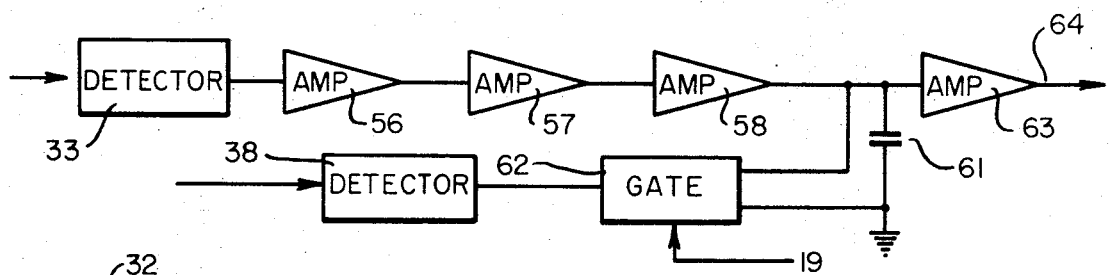
FIG. 6 is a more detailed block diagram of the system of the present invention.

A detailed block diagram is shown in FIG. 6. The output of transducer 33 is applied to three stages of amplification represented by the amplifiers 56, 57 and 58. The amplifier 58 serves as an isolation amplifier and its output applies current to a precision capacitor 61.

The capacitor is shorted out by gate 62 at all times except during the reading period. The gate 62 is opened by the pulse 51 from the transducer 38. Thus, when a pulse is present, the gate 62 is opened thereby allowing the capacitor 61 to charge. The capacitor will charge to a value which corresponds to the peak value of the output of the transducer 33 indicated at 48, FIG. 8A. An amplifier 63 is connected to the precision capacitor and provides an output signal on the line 64. This signal will be indicative of the peak signal. The gate 62 is closed by the feedback signal applied from line 19. This discharges the capacitor after the output 64 is read thereby allowing reading of the next pulse. FIG. 8C shows the voltage on capacitor 61. Thus, the capacitor charges following input pulse 48 along the line 66 to a peak value as represented by 67. As soon as the peak value is read by the analog to digital converter, the capacitor is discharged as shown at 68. Operation of the gate 62 is shown in FIG. 8D. Thus, the gate is opened with the beginning of the pulse 69 and is closed with the termination of the pulse. The reset pulse on line 19 is shown at 71, FIG. 8F. The read pulse which serves to command associated apparatus to read the voltage 67 on the capacitor is shown at FIG. 8E.

Figure 7:
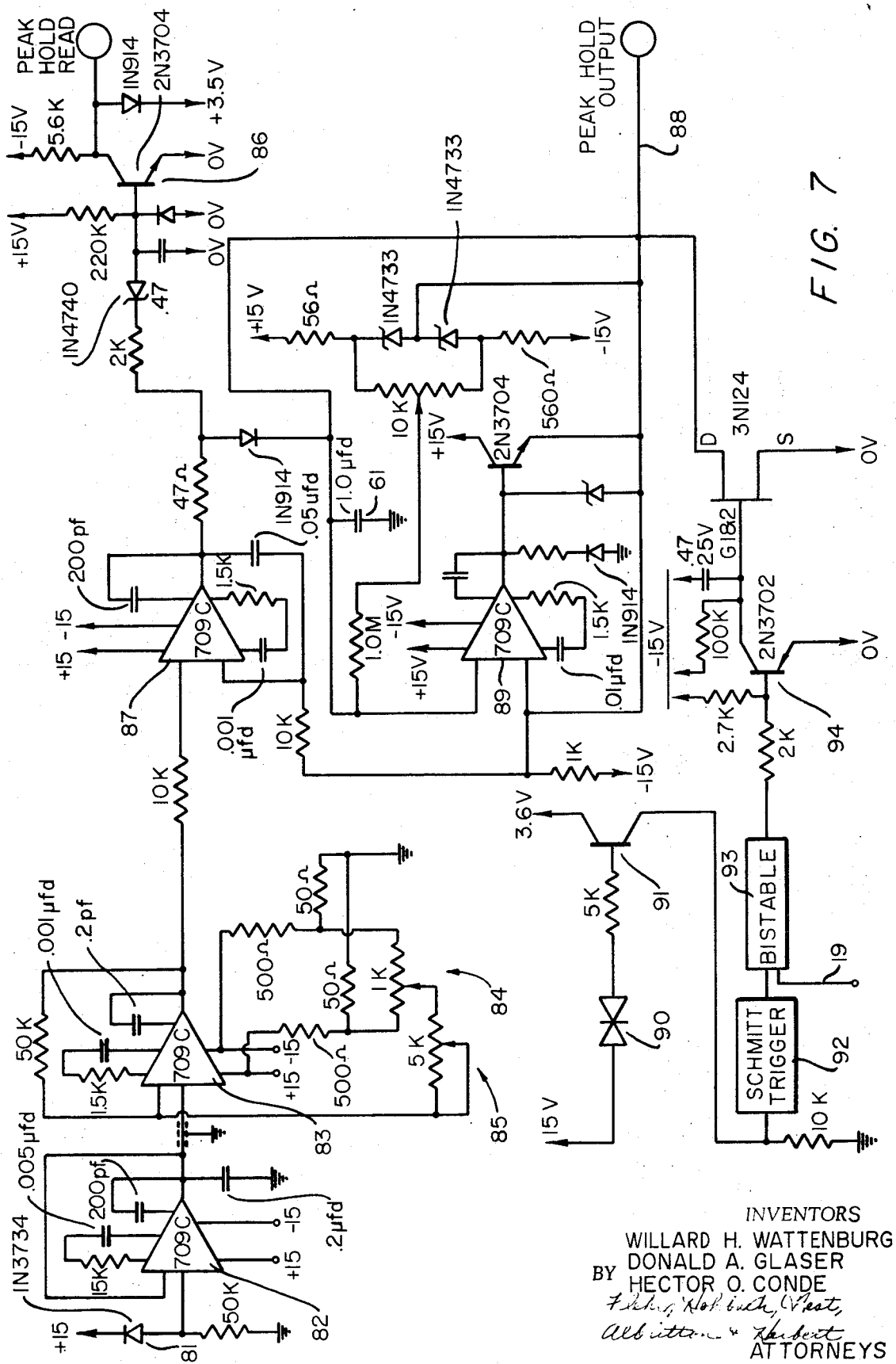
FIG. 7 is a detailed schematic diagram of the peak reading system of the present invention.

A detailed circuit diagram of a peak reading circuit corresponding to the block diagrams of FIGS. 1 and 6 is shown in FIG. 7.

In the present circuit extensive use is made of integrated circuit amplifiers. The amplifiers are Models 709C manufactured by Fairchild Semiconductor Corp., Mountain View, Calif. Photodiode 81 provides a signal to the input of the first gain of one amplifier stage 82. The output from this amplifier is applied to a second amplifier 83 which includes both a zero adjustment 84 and a gain adjustment 85. The amplified output is applied to an isolation amplifier 87 which feeds a current to the precision capacitor 61. When the capacitor is fully charged and there is no more change in voltage, the circuit 86 including the transistor 2N3704 and associated circuitry generates a command pulse which commands the read circuits to read the voltage on the capacitor. The voltage on the capacitor is available on line 88 connected to the capacitor through isolation amplifier 89.

The field effect transistor 3N124 acts as the gate and is closed to essentially short out the capacitor 61 between reading cycles. The field effect transistor is controlled as follows: when light is received by the photo-transistor 91, a pulse is applied to a Schmitt trigger 92 which triggers if the voltage exceeds a predetermined value. The Schmitt trigger then controls a bistable circuit 93 which provides an output pulse 72, FIG. 8E, to amplifier 94 which drives the field effect transistor. A reset pulse is applied to the bistable circuit 93 along the line 19 as previously described. If desired, the bistable circuit may be replaced by a monostable circuit which has a predetermined switching time whereby when a pulse is received from the Schmitt trigger, the monostable circuit switches to open the field effect transistor for a predetermined period of time to allow the capacitor to charge and the peak voltage to be read, at which time it switches to close the field effect transistor and short the capacitor.

The read pulse occurs only when light strikes transducer 91 whereby to eliminate any interference from noise, stray light or the like. Thus, the peak reading is obtained and the transducer only reads as the tube is directly in line. Since the maximum is always read as the particular test tube circulates through the apparatus and is re-presented for its second reading. Any variation will be due to change in density.

A system including a circuit with the component values shown was constructed and operated. Repeatability between successive readings of a reference sample tube was within 1.5 percent.

Thus, there is provided an improved optical density measuring system in which standard sample holders such as test tubes may be employed. The comparative readings indicating changes in optical density will be relatively accurate since the readings are taken at the same location on the tube when a peak reading occurs. In order to increase the accuracy of the readings, matched test tubes can be used.

We claim:

1. In a system of the type described in which an optical reading station, comprising means forming a light beam and a photoelectric transducer spaced therefrom to receive said beam and provide an electrical signal proportional to the light intensity, has presented thereto sequentially and repeatedly samples for analysis, the improvement comprising means for continuously moving the samples through said reading station, a signal processing system including means serving to generate a read signal for each sample, means serving to receive the signal from the photoelectric transducer responsive to said read signal and provide a peak signal representative of the peak amplitude of said phototransducer signal as the samples are moved therethrough, indicating means for receiving said peak signal and providing an indication of the same and conditioning means for conditioning said means for receiving said signal to receive an input signal corresponding to the next sample.

2. A system as in claim 1 wherein said means for providing a peak signal comprises a capacitor adapted to be charged to a peak value by the signal from said transducer.

3. A system as in claim 2 in which said conditioning means includes a gate means having an open and closed condition connected to said capacitor and serving to short out the capacitor in its closed condition, said gate being changed to its open condition in response to said read signal to allow the capacitor to fully charge and being closed after the peak signal is indicated.

4. A system as in claim 1 in which the samples for analysis are disposed in sample holders carried by holding means include an aperture whereby said light beam cooperates with the holding means to impinge on the transducer only when the sample holder is centered in the beam.

5. A system as in claim 1 wherein said means for generating a read signal includes a second photoelectric transducer.

6. A system as in claim 1 wherein said means for receiving the peak signal and providing an indication of the same comparises a digital voltmeter.

References Cited

UNITED STATES PATENTS

| 2,809,751 | 10/1957 | Hall | 256—223 X |
| 3,057,254 | 10/1962 | Drury | 356—226 X |
| 3,245,533 | 4/1966 | Rottmann | 250—223 X |
| 3,322,958 | 5/1967 | Heiss | 250—223 X |
| 3,415,997 | 12/1968 | Vinzelberg et al. | 250—218 X |

WILLIAM F. LINDQUIST, Primary Examiner

T. N. GRIGSBY, Asistant Examiner

U.S. Cl. X.R.

250—218, 223; 356—39, 226, 227